US012746969B2

(12) United States Patent
Kim

(10) Patent No.: US 12,746,969 B2
(45) Date of Patent: Sep. 29, 2026

(54) STEERING CONTROL SYSTEM FOR VEHICLE

(71) Applicant: HL MANDO CORPORATION, Gyeonggi-do (KR)

(72) Inventor: Jeong Rae Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 30 days.

(21) Appl. No.: 18/925,032

(22) Filed: Oct. 24, 2024

(65) Prior Publication Data

US 2025/0346292 A1 Nov. 13, 2025

(30) Foreign Application Priority Data

May 7, 2024 (KR) ........................ 10-2024-0059803

(51) Int. Cl.
B62D 6/00 (2006.01)
B62D 6/10 (2006.01)

(52) U.S. Cl.
CPC ............... B62D 6/002 (2013.01); B62D 6/10 (2013.01)

(58) Field of Classification Search
CPC . B62D 6/002; B62D 6/10; B62D 1/14; B62D 15/025; B62D 1/183; B62D 5/006; B62D 1/12; B62D 6/008; B60Y 2400/83
USPC ........................................................... 701/41
See application file for complete search history.

(56) References Cited

U.S. PATENT DOCUMENTS

| | | | | |
|---|---|---|---|---|
| 6,604,757 B1 * | 8/2003 | Huang | ..................... | B62D 1/12 280/778 |
| 2019/0176868 A1 * | 6/2019 | Kreutz | ..................... | B62D 1/08 |
| 2022/0315097 A1 * | 10/2022 | Yoshida | ................. | B62D 6/008 |

FOREIGN PATENT DOCUMENTS

| | | |
|---|---|---|
| KR | 20010112723 A | 12/2001 |
| KR | 101858398 B1 | 6/2018 |
| KR | 1020210055290 A | 5/2021 |

* cited by examiner

*Primary Examiner* — Yi-Kai Wang
(74) *Attorney, Agent, or Firm* — WOMBLE BOND DICKINSON (US) LLP

(57) ABSTRACT

Provided is a steering control system for a vehicle. Steering levers are provided in front or on both left and right sides of the driver's seat and a driver is allowed to manipulate the steering levers to change the direction of travel of the vehicle. Accordingly, the driver quickly and accurately controls the direction of travel of the vehicle as desired. Space utilization is also maximized by minimizing the space occupied by the steering manipulator within the vehicle in the autonomous driving mode.

17 Claims, 10 Drawing Sheets

STEERING CONTROL SYSTEM FOR VEHICLE

CROSS REFERENCE TO RELATED APPLICATION

This application claims priority from Korean Patent Application No. 10-2024-0059803, filed on May 7, 2024, which is hereby incorporated by reference for all purposes as if fully set forth herein.

BACKGROUND

Field

Embodiments relate to a steering control system for a vehicle that changes the direction of travel of a vehicle by manipulating the steering lever.

Description of Related Art

In recent years, there has been a growing interest in autonomous driving systems, which have the ability to drive automatically without driver manipulation.

Such an autonomous driving system analyzes data from a variety of sensors mounted on a vehicle, including a satellite navigation device, an inertial navigation device, radars, ultrasonic meters, laser scanners, and cameras, to determine the shape of the road and detect obstacles.

In addition, the autonomous driving system controls the steering and speed of the vehicle based on the determined road shape and the detected obstacles, so that the vehicle travels while avoiding obstacles.

However, in some cases, autonomous driving may not be possible and driver manipulation may be required depending on the shape of the road and the position of obstacles.

For example, in an environment where the lines on a multi-lane road are not painted due to external factors such as construction or other reasons, in an environment where there are duplicate lines because existing lines are not properly erased when repainting lanes or the like, in an environment where the road is congested due to a change in the driving environment caused by an accident up ahead, temporary construction, or the like or due to an increased number of vehicles, or in some other embodiments, a driver may be required to manipulate the vehicle, even though the vehicle is equipped with an autonomous driving system.

BRIEF SUMMARY

Embodiments may provide a steering control system for a vehicle in which the steering levers are provided in front or on both left and right sides of the driver's seat and a driver is allowed to manipulate the steering levers to change the direction of travel of the vehicle, so that not only can the driver quickly and accurately control the direction of travel of the vehicle as desired, but also space utilization can be maximized by minimizing the space occupied by the steering manipulator within the vehicle in the autonomous driving mode.

According to an aspect, embodiments may provide a steering control system including: a mode selector configured to switch a driving mode for a vehicle between an autonomous driving mode or a manual driving mode; a steering manipulator configured to be manipulatable by a driver to steer the vehicle when the driving mode for the vehicle is the manual driving mode; a reaction force generator configured to generate a steering reaction force and a restoring reaction force in response to manipulation of the steering manipulator by the driver; and a controller configured to determine a target steering angle according to the manipulation of the steering manipulator by the driver and drive a steering motor according to the target steering angle. The steering manipulator may include: a mount member coupled to a dashboard of the vehicle and configured to be insertable or withdrawable into or from the dash board; a frame member coupled to an end of the mount member and extending in a direction different from the mount member; and a pair of steering levers coupled to opposite ends of the frame member, respectively, to allow the driver to steer the vehicle by moving the pair of steering levers.

According to another aspect, embodiments may provide a steering control system including: a mode selector configured to switch a driving mode for a vehicle between an autonomous driving mode or a manual driving mode; a steering manipulator configured to be manipulatable by a driver to steer the vehicle when the driving mode for the vehicle is the manual driving mode; a reaction force generator configured to generate a steering reaction force and a restoring reaction force in response to manipulation of the steering manipulator by the driver; and a controller configured to determine a target steering angle in response to the manipulation of the steering manipulator by the driver and drive a steering motor according to the target steering angle. The steering manipulator may include: a first mount member arranged at a first side of a seat and configured to be movable in insertable and withdrawable direction; a first frame member coupled to an end of the first mount member and extending in direction different from the first mount member; and a first steering lever coupled to an end of the first frame member to allow the driver to steer the vehicle by moving the first steering lever.

According to exemplary embodiments, in the steering control system for a vehicle, the steering levers are provided in front or on both left and right sides of the driver's seat and a driver is allowed to manipulate the steering levers to change the direction of travel of the vehicle, so that not only can the driver quickly and accurately control the direction of travel of the vehicle as desired, but also space utilization can be maximized by minimizing the space occupied by the steering manipulator within the vehicle in the autonomous driving mode.

DESCRIPTION OF DRAWINGS

The above and other objects, features, and advantages of the present disclosure will be more clearly understood from the following detailed description, taken in conjunction with the accompanying drawings, in which.

DETAILED DESCRIPTION

Figure 1:
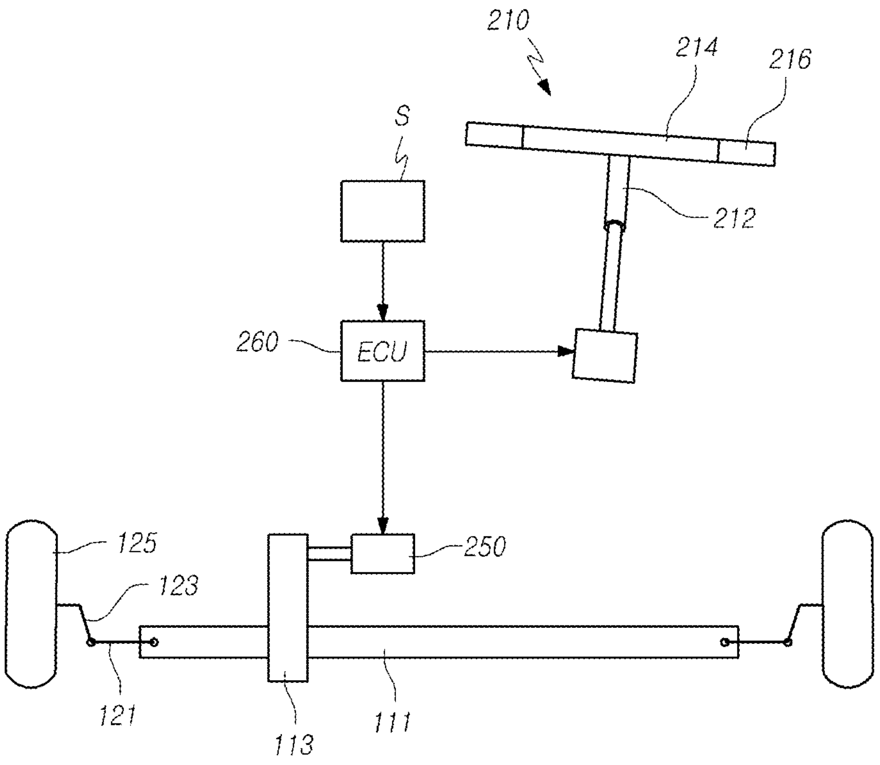
FIG. 1 schematically illustrates a steering control system for a vehicle according to embodiments.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "made up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after", "subsequent to", "next", "before", and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
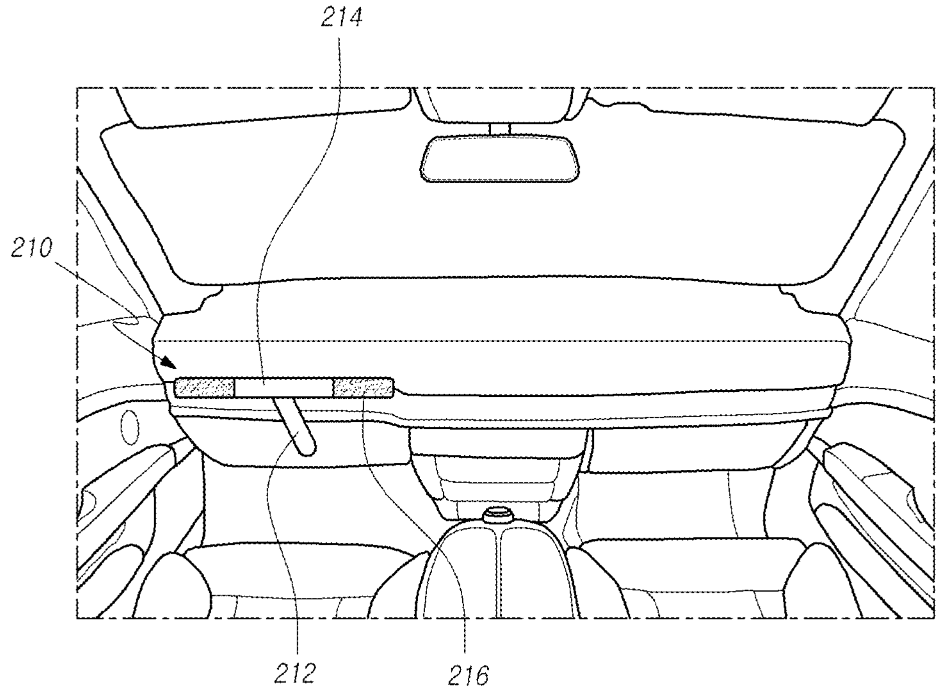
FIG. 2 illustrates a state in which a steering control system for a vehicle according to an embodiment is mounted on a vehicle.
Figure 3:
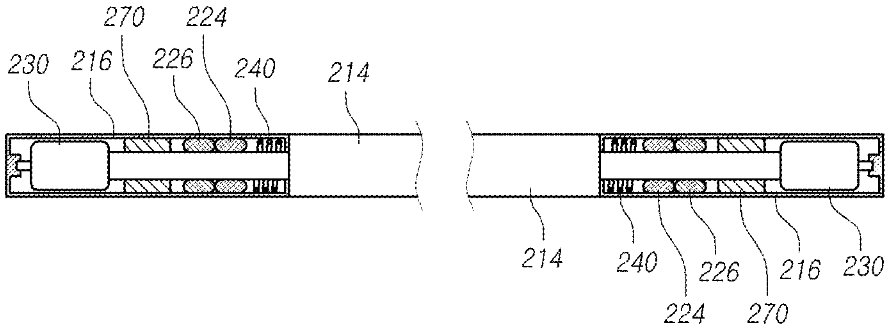
FIG. 3 is a cross-sectional view illustrating portions of the steering control system for a vehicle according to an embodiment.
Figure 4:
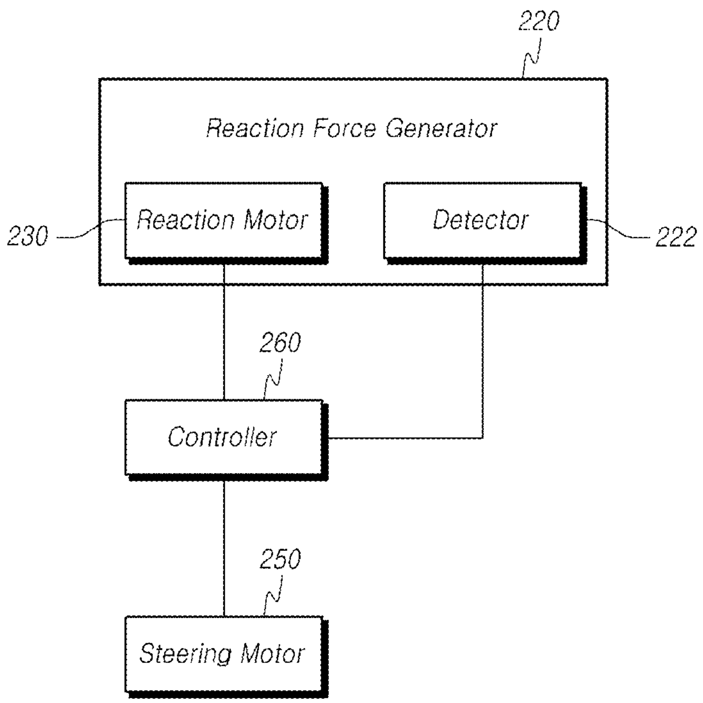
FIG. 4 is a block diagram illustrating portions of the steering control system for a vehicle according to an embodiment.
Figure 5:
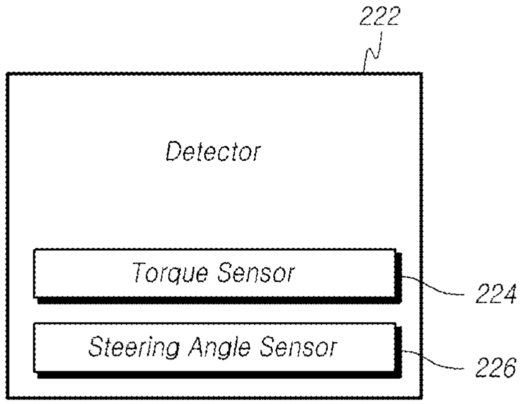
FIG. 5 is a block diagram illustrating a detector of the steering control system for a vehicle according to an embodiment.
Figure 6:
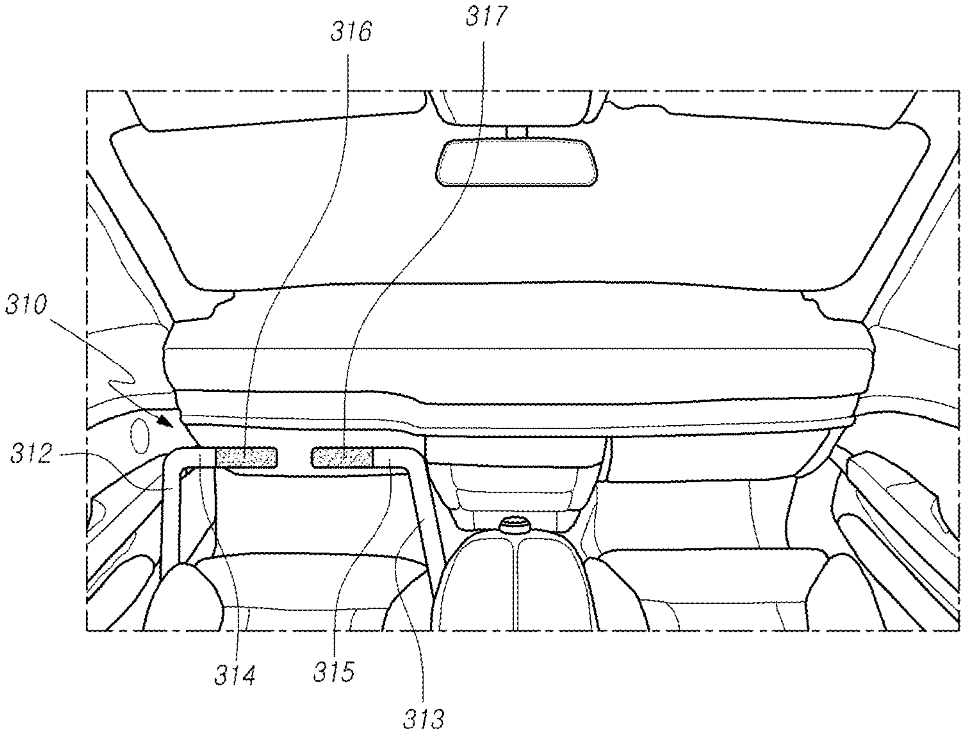
FIG. 6 illustrates a state in which a steering control system for a vehicle according to another embodiment is mounted on a vehicle.
Figure 7:
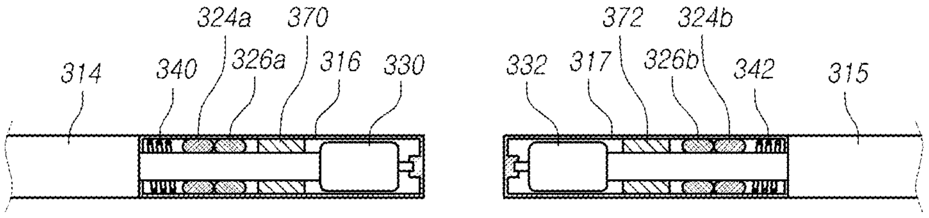
FIG. 7 is a cross-sectional view illustrating portions of the steering control system for a vehicle according to another embodiment.
Figure 8:
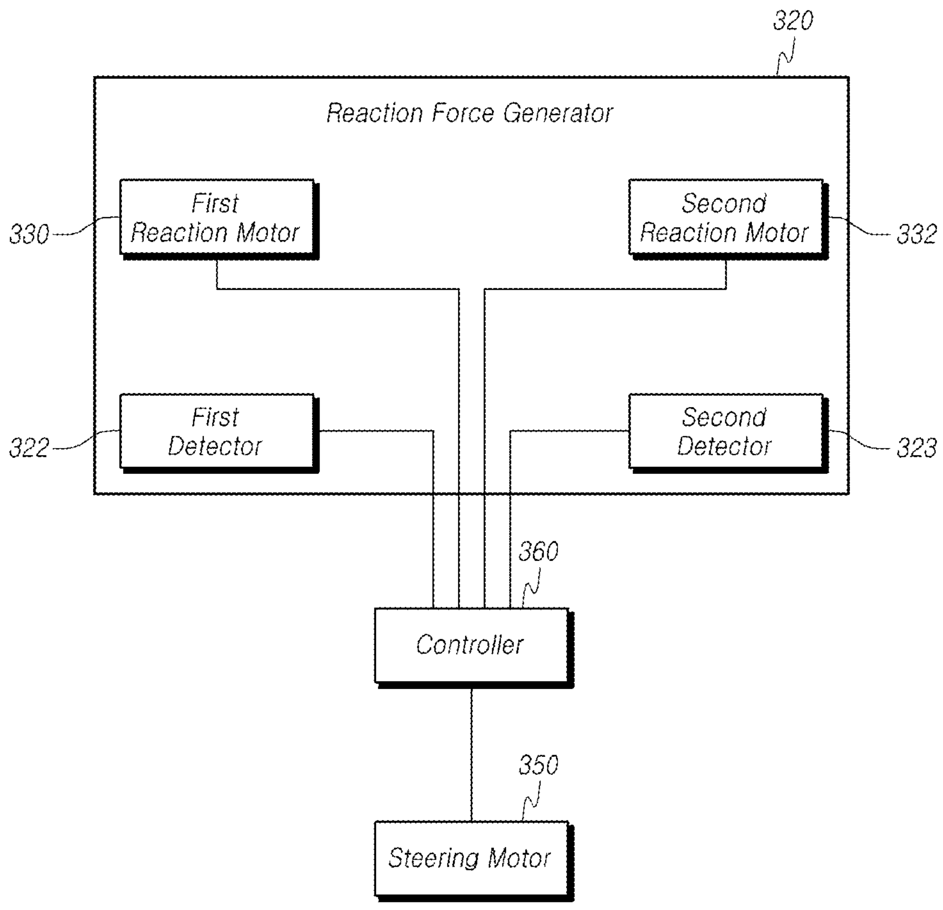
FIG. 8 is a block diagram illustrating portions of the steering control system for a vehicle according to another embodiment.
Figure 9:
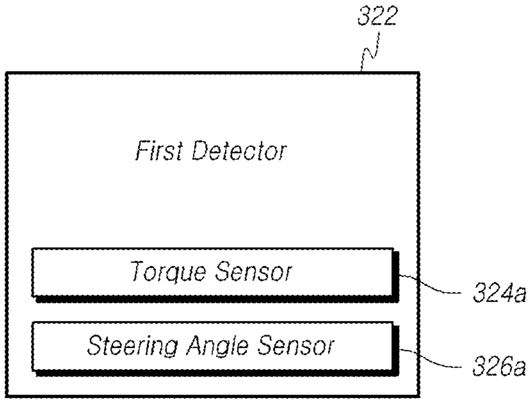
FIG. 9 is a block diagram illustrating a first detector of the steering control system for a vehicle according to another embodiment.
Figure 10:
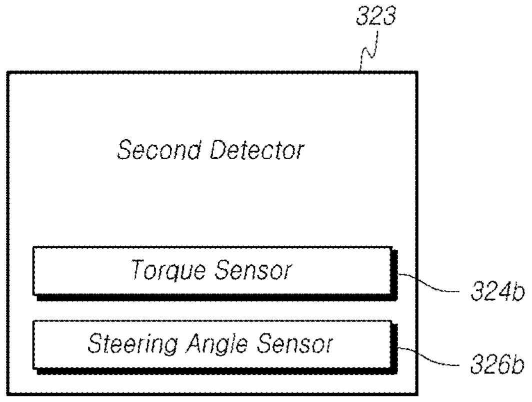
FIG. 10 is a block diagram illustrating a second detector of the steering control system for a vehicle according to another embodiment.

FIG. 1 schematically illustrates a steering control system for a vehicle according to embodiments, FIG. 2 illustrates a state in which a steering control system for a vehicle according to an embodiment is mounted on a vehicle, FIG. 3 is a cross-sectional view illustrating portions of the steering control system for a vehicle according to an embodiment, FIG. 4 is a block diagram illustrating portions of the steering control system for a vehicle according to an embodiment, FIG. 5 is a block diagram illustrating a detector of the steering control system for a vehicle according to an embodiment, FIG. 6 illustrates a state in which a steering control system for a vehicle according to another embodiment is mounted on a vehicle, FIG. 7 is a cross-sectional view illustrating portions of the steering control system for a vehicle according to another embodiment, FIG. 8 is a block diagram illustrating portions of the steering control system for a vehicle according to another embodiment, FIG. 9 is a block diagram illustrating a first detector of the steering control system for a vehicle according to another embodiment, and FIG. 10 is a block diagram illustrating a second detector of the steering control system for a vehicle according to another embodiment.

First, referring to FIG. 1, a steering control system for a vehicle according to embodiments is configured such that a torque sensor 224 and an angle sensor 226 are coupled to a steering lever 216, and if a driver manipulates the steering lever 216, the torque sensor 224 and the angle sensor 226 transmit electrical signals to a controller 260 to operate a reaction motor 230 and a steering motor 250.

The controller 260 controls the reaction motor 230 and the steering motor 250 based on electrical signals transmitted from the torque sensor 224 and the angle sensor 226, as well as electrical signals transmitted from other sensors mounted on the vehicle.

The reaction motor 230 provides a reaction force to the steering lever 216 to provide the driver with a feeling of steering reaction in the opposite direction if the steering lever 216 is manipulated in a manual driving mode, and the steering lever 216 is rotated under the control of the controller 260 in an autonomous driving mode.

The steering motor 250 is configured to slide a rack bar 111 connected to a pinion shaft 113 to steer both wheels 125 through tie rods 121 and knuckle arms 123.

The present embodiment may include the torque sensor 224 and the angle sensor 226 provided on the steering lever 216, as well as a speed sensor, a pinion shaft rotation angle sensor, a motor position sensor, various radars and LiDAR devices, and the like for transmitting steering information to the controller 260, and detailed description of these components will be omitted below.

The steering control system for a vehicle according to the present embodiment is mounted on a vehicle equipped with an autonomous driving system to change or maintain the direction of travel of the vehicle if the manual driving mode is selected.

The autonomous driving system refers to a system able to recognize the surrounding environment and autonomously drive to a destination without driver intervention.

The vehicle may enter the autonomous driving mode or the manual driving mode in response to an input from the driver (or driver input).

For example, the vehicle may be switched from the autonomous driving mode to the manual driving mode or from the manual driving mode to the autonomous driving mode by means of a mode selector S of a driver interface device in response to the received driver input.

The vehicle may also be switched from the autonomous driving mode to the manual driving mode based on driving situation information.

Here, the driving situation information may include at least one of information about objects external to the vehicle, navigation information, and vehicle state information.

For example, the vehicle may be switched from the manual driving mode to the autonomous driving mode or from the autonomous driving mode to the manual driving mode, based on the driving situation information generated by an object detection device.

In this case, if the vehicle is operated in the autonomous mode, the vehicle may be operated by the autonomous driving system.

A steering control system for a vehicle according to an embodiment includes: a mode selector S configured to switch a driving mode for a vehicle between an autonomous driving mode or a manual driving mode; a steering manipulator 210 configured to be manipulatable by a driver to steer the vehicle when the driving mode for the vehicle is the manual driving mode; a reaction force generator 220 configured to generate a steering reaction force and a restoring reaction force in response to manipulation of the steering manipulator 210 by the driver; and a controller 260 configured to determine a target steering angle according to the manipulation of the steering manipulator 210 by the driver and drive a steering motor 250 according to the target steering angle.

The mode selector S switches from the autonomous driving mode to the manual driving mode or from the manual driving mode to the autonomous driving mode based on the received driver input.

In the autonomous driving mode, the autonomous driving system recognizes the surrounding environment and automatically drives to a destination according to the recognized surrounding environment.

In manual driving mode, the driver manipulates the steering manipulator 210 to drive to the destination.

The steering manipulator 210 is for changing or maintaining the direction of travel of the vehicle, and includes: a mount member 212 coupled to the dashboard of the vehicle and configured to be insertable or withdrawable into or from the dash board; a frame member 214 coupled to an end of the mount member 212 and extending in a direction different from the mount member; and a pair of steering levers 216 coupled to ends of the frame member 214, respectively, to allow the driver to steer the vehicle by moving the pair of steering levers 216.

The mount member 212 is coupled to the dashboard of the vehicle in an insertable and withdrawable manner, the frame member 214 is coupled to the end of the mount member 212 in the intersecting direction, and the pair of steering levers 216 are rotatably coupled to the opposite ends of the frame member 214.

In the steering control system for a vehicle according to an embodiment, if the autonomous driving mode is selected by the mode selector S, the steering manipulator 210 is inserted into the dashboard of the vehicle by the mount member 212, and if the manual driving mode is selected, the steering manipulator 210 is withdrawn from the dashboard of the vehicle by the mount member 212 to allow the driver to manipulate the pair of steering levers 216.

The pair of steering levers 216 are configured to be rotatable about a central axis extending from the frame member 214, and the pair of steering levers 216 are rotatable in opposite directions to each other.

Here, the pair of steering levers 216 are configured to be rotatable by the manipulation by the driver.

the steering manipulator 210 is configured such that the pair of steering levers 216 are caused to rotate in opposite directions at the same speed by an external force.

That is, the pair of steering levers 216 are rotatably coupled to opposite ends of the frame member 214, respectively.

In addition, the pair of steering levers 216 work in concert to rotate in a first direction or a second opposite direction about the central axis extending from the center to opposite sides of the frame member 214.

More specifically, the pair of steering levers 216 are connected through linkage mechanisms, such as gears, so that they rotate in opposite directions at the same speed.

In addition, the reaction force generator 220 is configured to generate a steering reaction force in response to rotation of the pair of the steering levers 216.

The reaction force generator 220 provides a steering reaction force in directions opposite to the movement of the pair of steering levers 216. The reaction force generator 220 generates a steering reaction force and a restoring reaction force according to the position and displacement of the steering manipulator 210.

More specifically, the reaction generator 220 includes: a detector 222 configured to detect positions and displacements of the pair of steering levers 216; and a reaction motor 230 configured to generate a steering reaction force on the pair of steering levers 216 according to the position and displacement of the pair of steering levers 216 detected by the detector 222.

The detector 222 is for detecting the positions and displacements of the pair of steering levers 216, and includes: a torque sensor 224 configured to detect a steering torque according to the positions and displacements of the pair of steering levers 216; and an angle sensor 226 detecting rotation speeds and rotation angles of the pair of steering levers 216 according to the positions and displacements of the pair of steering levers 216.

The angle sensor 226 detects the steering angle based on the position and displacement of a pair of steering levers 216.

Next, the controller 260 is configured to calculates the target steering angle using the steering torque detected by the torque sensor 224 and control steering of the vehicle according to the target steering angle.

The controller is configured to calculate the target steering angle using the steering angle detected by the angle sensor and control steering of the vehicle according to the target steering angle.

The controller 260 drives the steering motor 250 according to a target steering angle output from the steering manipulator 210.

For example, the controller 260 calculates the steering torque detected by the torque sensor 224 as the target steering angle and controls the steering motor 250 to steer according to the target steering angle, or calculates the steering angle detected by the angle sensor 226 as the target steering angle and controls the steering motor 250 to steer according to the target steering angle.

In addition, the controller 260 is configured to determine a reaction torque according to a state of the steering of the vehicle, and drive the reaction motor 230 based on the reaction torque.

Here, if the speed of the vehicle is increased, the controller 260 increases the current applied to the reaction motor 230 so that a steering force provided in directions opposite to the rotation of the pair of steering levers 216 is increased. If the speed of the vehicle is decreased, the controller 260 decreases the current applied to the reaction motor 230 so that the steering force provided in directions opposite to the rotation of the pair of steering levers 216 is decreased.

Accordingly, the controller 260 may increase the reaction force to prevent the driver from rotating the steering manipulator 210 abruptly if the vehicle speed increases, and decrease the reaction force to allow the driver to steer smoothly to turn the vehicle easily if the vehicle speed decreases.

In this case, the controller 260 may control the current supplied to the reaction motor 230 to increase gradually from a low-speed running section to a high-speed running section or to decrease gradually from the high-speed running section to the low-speed running section.

In addition, the reaction force generator 220 is configured to include a reaction force member 240 that generate the restoring reaction force to move the pair of steering levers 216 to neutral positions in response to no external force applied to the pair of steering levers 216.

The reaction force member 240 is provided between the frame member 214 and the pair of steering levers 216 to provide elastic force to the pair of steering levers 216, and includes a torsion spring to generate a restoring reaction force to move the pair of steering levers 216 to neutral positions if no external force is applied to the pair of steering levers 216.

Here, a bush member 270 or bearing member is provided between the frame member 214 and the pair of steering levers 216 to support the rotation of the pair of steering levers 216 so that the pair of steering levers 216 may rotate smoothly at constant positions.

As described above, by providing the pair of steering levers 216 in front of the driver's seat and allowing the driver to manipulate the pair of steering levers 216 to change the direction of travel of the vehicle, not only can the driver quickly and accurately control the direction of travel of the vehicle as desired, but also space utilization can be maximized by minimizing the space occupied by the steering manipulator 210 within the vehicle in the autonomous driving mode.

A steering control system for a vehicle according to another embodiment includes: a mode selector S configured to switch a driving mode for a vehicle between an autonomous driving mode or a manual driving mode; a steering manipulator 310 configured to be manipulatable by a driver to steer the vehicle when the driving mode for the vehicle is the manual driving mode; a reaction force generator 320 configured to generate a steering reaction force and a restoring reaction force in response to manipulation of the steering manipulator 310 by the driver; and a controller 360 configured to determine a target steering angle in response to the manipulation of the steering manipulator by the driver and drive a steering motor 350 according to the target steering angle.

The mode selector S switches from the autonomous driving mode to the manual driving mode or from the manual driving mode to the autonomous driving mode based on the received driver input.

In the autonomous driving mode, the autonomous driving system recognizes the surrounding environment and automatically drives to a destination according to the recognized surrounding environment.

In manual driving mode, the driver manipulates the steering manipulator 310 to drive to the destination.

The steering manipulator 310 includes: a first mount member 312 arranged at a first side of the seat and configured to be movable in insertable and withdrawable directions; a first frame member 314 coupled to an end of the first mount member 312 and extending in a direction different from the first mount member; a first steering lever 316 coupled to an end of the first frame member 314 to allow the driver to steer the vehicle by moving the first steering lever; a second mount member 313 arranged at a second side of the seat and configured to be movable in the insertable and withdrawable directions; a second frame member 315 coupled to an end of the second mount member 313 and extending in a direction different from the second mount member; and a second steering lever 317 rotatably coupled to an end of the second frame member 315 to allow the driver to steer the vehicle by moving the second steering lever.

The first mount member 312 is coupled to the first side of the seat in an insertable and withdrawable manner, the first frame member 314 is coupled to the end of the first mount member 312 in the intersecting direction, and the first steering lever 316 is rotatably coupled to the end of the first frame member 314.

In addition, the second mount member 313 is coupled to the second side of the seat in an insertable and withdrawable manner, the second frame member 315 is coupled to the end of the second mount member 313 in the intersecting direction, and the second steering lever 317 is rotatably coupled to the end of the second frame member 315.

In the steering control system for a vehicle according to another embodiment, if the autonomous driving mode is selected by the mode selector S, the steering manipulator 310 is inserted into the first side and the second side of the seat by the first mount member 312 and the second mount member 313, and if the manual driving mode is selected, the steering manipulator 310 is withdrawn from the first side and the second side of the seat by the first mount member 312 and the second mount member 313 to allow the driver to manipulate the first steering lever 316 and the second steering lever 317.

The pair of steering levers are configured to be rotatable about a central axis extending from the frame member, and the pair of steering levers are rotatable in opposite directions to each other.

Here, the first steering lever and the second steering lever are configured to be rotatable by the manipulation by the driver.

The steering manipulator 310 is configured such that the first steering lever 316 and the second steering lever 317 are caused to rotate in opposite directions at the same speed by an external force.

That is, the first steering lever 316 is rotatably coupled to the end of the first frame member 314, and the second steering lever 317 is rotatably coupled to the end of the second frame member 315.

In addition, the first steering lever 316 rotates in a first direction about the central axis extending from the center to opposite sides of the first frame member, and the second steering lever 317 works in concert with the first steering lever 316 to rotate in the opposite direction about the central axis extending from the center to opposite sides of the second frame member 315.

More specifically, the first steering lever 316 and the second steering lever 317 are connected through linkage mechanisms, such as gears, so that they rotate in opposite directions at the same speed.

In addition, the reaction force generator 320 is configured to generate a steering reaction force in a direction opposite to rotation of the first steering lever 316 or the second steering lever 317.

The reaction force generator 320 generates a steering reaction force and a restoring reaction force according to the position and displacement of the steering manipulator 310.

More specifically, the reaction force generator 320 includes: a first detector 322 configured to detect a position and displacement of the first steering lever 316; a first reaction motor 330 configured to generate a steering reaction force on the first steering lever 316 according to the position and displacement of the first steering lever 316 detected by the first detector 322; a second detector 323 configured to detect the position and displacement of the second steering lever 317; and a second reaction motor 332 configured to generate a steering reaction force on the second steering lever 317 according to the position and displacement of the second steering lever 317 detected by the second detector 323.

The first detector 322 detects the position and displacement of the first steering lever 316, and the second detector 323 detects the position and displacement of the second steering lever 317.

The torque sensors 324*a* and 324*b* detect a steering torque based on the position and displacement of the first steering lever 316 and/or the second steering lever 317.

The angle sensors 336*a* and 326*b* detect a steering angle based on the position and displacement of the first steering lever 316 and/or the second steering lever 317.

The controller 360 is configured to calculate a target steering angle using the steering torque detected by the torque sensor 324*a* and 324*b* and control steering of the vehicle according to the target steering angle.

The controller 360 is configured to calculate a target steering angle using the steering angle detected by the angle sensor 336*a* and 326*b* and control the steering of the vehicle according to the target steering angle.

Here, the first steering lever 316 includes: a torque sensor 324 a detecting a steering torque according to a position and displacement of the first steering lever 316; and an angle sensor 326*a* detecting a rotation speed and a rotation angle of the first steering lever 316 according to the position and displacement of the first steering lever 316. The second steering lever 317 includes: a torque sensor 324*b* detecting a steering torque according to a position and a displacement of the second steering lever 317; and an angle sensor 326*b* detecting a rotation speed and a rotation angle of the second steering lever 317 according to the position and displacement of the second steering lever 317.

Here, the torque sensor and the angle sensor may be provided on one or more of the first steering lever 316 or the second steering lever 317.

Next, the controller 360 drives the steering motor 350 according to a target steering angle output from the steering manipulator 310.

For example, the controller 360 calculates the steering torque detected by the torque sensors 324*a* and 324*b* as the target steering angle and control the steering motor 350 to steer according to the target steering angle, or calculates the steering angle detected by the angle sensors 336*a* and 326*b* as the target steering angle and control the steering motor 350 to steer according to the target steering angle.

Then, the controller 360 is configured to determine a reaction torque according to a state of the steering of the vehicle, and drive the first reaction motor 330 or the second reaction motor 332 based on the reaction torque.

Here, if a speed of the vehicle is increased, the controller 360 increases the current applied to the first reaction motor 330 and the second reaction motor 332 so that a steering force provided in directions opposite to the rotation of the first steering lever 316 and the second steering lever 317 is increased. If a speed of the vehicle is decreased, the controller 360 decreases the current applied to the first reaction motor 330 and the second reaction motor 332 so that the steering force provided in directions opposite to the rotation of the first steering lever 316 and the second steering lever 317 is decreased.

Accordingly, the controller 360 may increase the reaction force to prevent the driver from rotating the steering manipulator 310 abruptly if the vehicle speed increases, and decrease the reaction force to allow the driver to steer smoothly to turn the vehicle easily if the vehicle speed decreases.

In this case, the controller 360 may control the current supplied to the first reaction motor 330 and the second reaction motor 332 to increase gradually from a low-speed running section to a high-speed running section or to decrease gradually from the high-speed running section to the low-speed running section.

In addition, the reaction force generator 320 is configured to include: a first reaction force member 340 generate the restoring reaction force to move the first steering lever 316 to a neutral position in response to no external force applied to the first steering lever 316; and a second reaction force member 342 generate the restoring reaction force to move the second steering lever 317 to a neutral position in response to no external force is applied to the second steering lever 317.

The first reaction force member 340 is provided between the first frame member 314 and the first steering lever 316 to provide elastic force to the second steering lever 316, and includes a torsion spring to generate a restoring reaction force to move the first steering lever 316 to the neutral position when no external force is applied to the first steering lever 316.

In addition, the second reaction force member 342 is provided between the second frame member 315 and the second steering lever 317 to provide elastic force to the second steering lever 317, and includes a torsion spring to generate a restoring reaction force to move the second steering lever 317 to the neutral position when no external force is applied to the second steering lever 317.

Here, a first bush member 370 or bearing member is provided between the first frame member 314 and the first steering levers 316 to support the rotation of the first steering lever 316 so that the first steering lever 316 may rotate smoothly at a constant position.

In addition, a second bush member 372 or bearing member is provided between the second frame member 315 and the second steering levers 317 to support the rotation of the second steering lever 317 so that the second steering lever 317 may rotate smoothly at a constant position.

Here, the steering control system for a vehicle of the present disclosure may be provided with only one of the steering manipulator including the first mount member 312, the first frame member 314, and the first steering lever 316 or the steering manipulator including the second mount member 313, the second frame member 315, and the second steering lever 317.

As described above, by providing the steering levers on both left and right sides of the seat and allowing the driver to manipulate the steering levers to change the direction of travel of the vehicle, not only can the driver quickly and accurately control the direction of travel of the vehicle as desired, but also space utilization can be maximized by minimizing the space occupied by the steering manipulator within the vehicle in the autonomous driving mode.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A steering control system comprising:

a mode selector configured to switch a driving mode for a vehicle between an autonomous driving mode or a manual driving mode;

a steering manipulator configured to be manipulatable by a driver to steer the vehicle when the driving mode for the vehicle is the manual driving mode;

a reaction force generator configured to generate a steering reaction force and a restoring reaction force in response to manipulation of the steering manipulator by the driver; and a controller configured to determine a target steering angle according to the manipulation of the steering manipulator by the driver and drive a steering motor according to the target steering angle, wherein the steering manipulator comprises:

a mount member coupled to a dashboard of the vehicle and configured to be insertable or withdrawable into or from the dash board;

a frame member coupled to an end of the mount member and extending in a direction different from the mount member; and a pair of steering levers coupled to ends of the frame member, respectively, to allow the driver to steer the vehicle by moving the pair of steering levers, wherein:

the pair of steering levers are configured to be rotatable by the manipulation by the driver, and the reaction force generator is configured to generate the steering reaction force in response to rotation of the pair of the steering levers.

2. The steering control system of claim 1, wherein the pair of steering levers are configured to be rotatable about a central axis extending from the frame member, and the pair of steering levers are rotatable in opposite directions to each other.

3. The steering control system of claim 2, wherein the reaction force generator comprises:

a detector configured to detect positions and displacements of the pair of steering levers; and a reaction motor configured to generate a steering reaction force on the pair of steering levers according to the position and displacement of the pair of steering levers detected by the detector.

4. The steering control system of claim 3, wherein:

the detector comprises a torque sensor configured to detect a steering torque according to the positions and displacements of the pair of steering levers, and the controller is configured to calculate the target steering angle using the steering torque detected by the torque sensor and control steering of the vehicle according to the target steering angle.

5. The steering control system of claim 3, wherein:

the detector comprises an angle sensor configured to detect a steering angle according to the positions and displacements of the pair of steering levers, and the controller is configured to calculate the target steering angle using the steering angle detected by the angle sensor and control steering of the vehicle according to the target steering angle.

6. The steering control system of claim 5, wherein the controller is configured to determine a reaction torque according to a state of the steering of the vehicle, and drive the reaction motor based on the reaction torque.

7. The steering control system of claim 6, wherein the controller is configured to:

if a speed of the vehicle is increased, increase a current applied to the reaction motor so that a steering force provided in directions opposite to the rotation of the pair of steering levers is increased, and if the speed of the vehicle is decreased, decrease the current applied to the reaction motor so that the steering force provided in the directions opposite to the rotation of the pair of steering levers is decreased.

8. The steering control system of claim 1, wherein the reaction force generator is configured to generate the restoring reaction force to move the pair of steering levers to neutral positions in response to no external force applied to the pair of steering levers.

9. A steering control system comprising:

a mode selector configured to switch a driving mode for a vehicle between an autonomous driving mode or a manual driving mode;

a steering manipulator configured to be manipulatable by a driver to steer the vehicle when the driving mode for the vehicle is the manual driving mode;

a reaction force generator configured to generate a steering reaction force and a restoring reaction force in response to manipulation of the steering manipulator by the driver; and a controller configured to determine a target steering angle in response to the manipulation of the steering manipulator by the driver and drive a steering motor according to the target steering angle, wherein the steering manipulator comprises:

a first mount member arranged at a first side of a seat and configured to be movable in insertable and withdrawable directions;

a first frame member coupled to an end of the first mount member and extending in a direction different from the first mount member; and a first steering lever coupled to an end of the first frame member to allow the driver to steer the vehicle by moving the first steering lever, a second mount member arranged at a second side of the seat and configured to be movable in the insertable and withdrawable directions;

a second frame member coupled to an end of the second mount member and extending in a direction different from the second mount member; and a second steering lever coupled to an end of the second frame member to allow the driver to steer the vehicle by moving the second steering lever, wherein:

the first steering lever and the second steering lever are configured to be rotatable by the manipulation by the driver, and the reaction force generator is configured to generate the steering reaction force in directions opposite to rotation of the first steering lever and the second steering lever.

10. The steering control system of claim 9, wherein the first steering lever and the second steering lever are configured to be rotatable about a central axis extending from the frame member, and the first steering lever and the second steering lever are rotatable in opposite directions to each other.

11. The steering control system of claim 10, wherein the reaction force generator comprises:

a first detector configured to detect a position and displacement of the first steering lever; and a first reaction motor configured to generate a steering reaction force on the first steering lever according to the position and displacement of the first steering lever detected by the first detector.

12. The steering control system of claim 11, wherein the reaction force generator comprises:

a second detector configured to detect a position and displacement of the second steering lever; and a second reaction motor configured to generate a steering reaction force on the second steering lever according to the position and displacement of the second steering lever detected by the second detector.

13. The steering control system of claim 12, further comprising one or more torque sensors configured to detect a steering torque according to the position and displacement of the first steering lever and/or the second steering lever, wherein the controller is configured to calculate the target steering angle using the steering torque detected by the torque sensor and control steering of the vehicle according to the target steering angle.

14. The steering control system of claim 12, further comprising an angle sensor configured to detect a steering angle according to the position and displacement of the first steering lever and/or the second steering lever, wherein the controller is configured to calculate the target steering angle using the steering angle detected by the angle sensor and control the steering of the vehicle according to the target steering angle.

15. The steering control system of claim 14, wherein the controller is configured to determine a reaction torque according to a state of the steering of the vehicle, and drive the first reaction motor or the second reaction motor based on the reaction torque.

16. The steering control system of claim 15, wherein the controller is configured to:

if a speed of the vehicle is increased, increase a current applied to the first reaction motor and the second reaction motor so that a steering force provided in directions opposite to the rotation of the first steering lever and the second steering lever is increased, and if the speed of the vehicle is decreased, decrease the current applied to the first reaction motor and the second reaction motor so that the steering force provided in the directions opposite to the rotation of the first steering lever and the second steering lever is decreased.

17. The steering control system of claim 9, wherein the reaction force generator is configured to:

generate the restoring reaction force to move the first steering lever to a neutral position in response to no external force applied to the first steering lever; and generate the restoring reaction force to move the second steering lever to a neutral position in response to no external force applied to the second steering lever.

* * * * *